(12) United States Patent
Burr et al.

(10) Patent No.: US 6,247,545 B1
(45) Date of Patent: Jun. 19, 2001

(54) SINGLE ENERGIZER FACE SEAL FOR ROCKS BITS WITH FLOATING JOURNAL BEARINGS

(75) Inventors: Bruce Hawley Burr, Houston; Jeffery E. Daly, Cypress, both of TX (US)

(73) Assignee: Camco International Inc., Houston, TX (US)

( * ) Notice: Subject to any disclaimer, the term of this patent is extended or adjusted under 35 U.S.C. 154(b) by 0 days.

(21) Appl. No.: 09/452,774

(22) Filed: Dec. 2, 1999

Related U.S. Application Data

(60) Provisional application No. 60/113,343, filed on Dec. 22, 1998.

(51) Int. Cl.$^7$ ..................................................... E21B 10/00
(52) U.S. Cl. ......................... 175/371; 277/352; 277/400; 277/406; 277/407; 384/94
(58) Field of Search ................................. 175/227, 228, 175/371, 372; 277/352, 400, 406, 407; 384/94

(56) References Cited

U.S. PATENT DOCUMENTS

| | | |
|---|---|---|
| 3,645,591 | 2/1972 | Winberg . |
| 3,761,145 | 9/1973 | Schumacher, Jr. . |
| 4,172,502 | 10/1979 | van Nederveen . |
| 4,199,156 | 4/1980 | Oldham et al. . |
| 4,249,622 * | 2/1981 | Dysart . |
| 4,306,727 | 12/1981 | Deane et al. . |
| 4,359,111 * | 11/1982 | Gonzalez . |
| 4,428,687 * | 1/1984 | Zahradnik . |
| 4,494,749 * | 1/1985 | Evans . |
| 4,516,641 | 5/1985 | Burr . |
| 4,747,604 | 5/1988 | Nakamura . |
| 4,753,304 | 6/1988 | Kelly, Jr. . |
| 4,824,123 | 4/1989 | Chia et al. . |
| 4,838,365 | 6/1989 | Kotch . |
| 5,040,624 * | 8/1991 | Schumacher et al. . |
| 5,360,076 | 11/1994 | Kelly, Jr. et al. . |
| 5,465,800 | 11/1995 | Pearce et al. . |

* cited by examiner

Primary Examiner—Roger Schoeppel
(74) Attorney, Agent, or Firm—Jeffrey E. Daly

(57) ABSTRACT

The present invention is a self adjusting, volume balanced, single energizer rigid face seal for rolling cutter drill bits with floating journal bearings. Volume balancing is accomplished by utilizing a floating static seal between the rigid face seal ring and the bearing shaft. This floating static seal ring is moved axially within a annular groove by the volume pulses caused by the axial play of the cutter when in operation. At one end of the annular groove the geometry of the rigid seal ring and bearing shaft are set such that the seal assembly achieves volume balance when the bearing is running on its OD. If the bearing is running on its OD, the floating static seal will move from where ever it is in the annular groove by the volume pulses until it reaches the balance volume position.

17 Claims, 4 Drawing Sheets

SINGLE ENERGIZER FACE SEAL FOR ROCKS BITS WITH FLOATING JOURNAL BEARINGS

This appln claims the benefit of Provisional No. 60/113,343 filed Dec. 22, 1998.

BACKGROUND OF THE INVENTION

1. Field of the Invention

This invention provides an enhanced rotary face seal design for roller cone rock bits. The new seal has a single energizer and a geometry which allows self adjusting volume balance compensation in bits with floating journal bearings.

2. Description of the Related Art

Modern, premium roller cone rock bits utilize sealing systems to prevent the loss of lubricant from the roller cones. The seal system also prevents the abrasive laden drilling fluid outside the bit from entering into, and causing failure of the bearing system of the rolling cones.

In most drill bits, an elastomeric packing ring provides the seal between the rolling cone and the bearing system. These bits utilize an elastomeric compression type sealing system, and have adequate performance in most drilling applications. For rock bits used in very severe bit applications, however, rotary mechanical face seals are disposed between the rolling cone and the bearing to provide the seal.

Rotary mechanical face seals are generally made up of two flat sealing faces which are designed to maintain a thin film of lubricant between the sealing faces. As the sealing surfaces rotate relative to each other, they are urged together at a carefully controlled force by one or more energizers as shown, for instance, in U.S. Pat. Nos. 5,360,076, 4,306,727, and 3,761,145.

Although generally more expensive than elastomer seals, mechanical face seals are able to assure a level of performance in rock drilling bits which easily justifies the higher cost. Most mechanical face seals used in rotary rock bits are made from stainless steels and have sealing faces which are manufactured to be flat and smooth. These faces mate together to form a planar, annular sealing interface.

Mechanical face seals (also known as rigid face seals) have become the seal of choice for rock bits used in the most severe drilling environments, due to the operating limitations of elastomers as dynamic seals. The mechanical face seals are typically manufactured from materials which readily tolerate the thermal, chemical and mechanical attack of severe drilling environments. The seals provide a higher level of reliability than elastomer seals in rock bits and are capable of extremely long runs without significant loss of lubricant.

A very important development for rigid face seals in rolling cutter drill bits is described in U.S. Pat. No. 4,516,641, herein incorporated by reference. When the bit is drilling, the bearing clearances between the rolling cutter and bearing spindle allow the cutter to move axially along the bearing shaft. This movement causes volume changes in the bearing area immediately adjacent to the seal. The magnitude of these volume changes depend upon the relative diameters of the journal bearing, the effective sealing diameters of the seal, and the axial movement of the cutter. These volume changes can cause extremely high local pressure spikes in the lubricant adjacent to the seal. Prior to the '641 invention, face seal designs for rolling cutter drill bits either allowed lubricant to vent between the seal faces during pressure spikes, or allowed the seal faces to endure extremely high loading during the pressure spikes.

In the '641 patent, the rigid face seal was made to be volume compensating. This allowed the seal to sweep a volume corresponding to the volume change of the lubricant in the cutter adjacent to the seal. The ability of the seal to move in response to volume changes eliminated the extreme pressure spikes adjacent to the seal during operation. In addition, volume compensation allows the sealing face load on the seal to remain relatively constant as the cutter moves axially upon the bearing journal during drilling. This design, therefore, provided a reliable rigid face seal for rock bits that could run for very long hours without significant loss of lubricant.

A limitation of this design, however, is the tendency of the static elastomeric seals/energizers to permanently deform in service. Relatively high seal squeeze on the elastomer is needed for the seal/energizer to transmit the torque of the seal faces. As is well know in the elastomer industry, elastomers tend to take a compression set in service. Once the elastomer has taken a set in service, slippage of the seal ring becomes more likely. Even a small amount of slippage can lead to rapid, catastrophic failure of the seal system.

For some bit designs, it is possible to design a bearing and seal combination that has little or no net lubricant volume displacement in the area of the bearing journal adjacent to the seal as the cutter moves axially. One such design is shown in U.S. Pat. No. 4,573,304, herein incorporated by reference. In this rigid face seal design, the pressures and volume are balanced by placing the static sealing element so that its mean diameter is the same as the diameter of the bearing journal. This design is also susceptible to seal/energizer slippage in service, leading to catastrophic seal failure.

Until the present invention, a single energizer, volume balanced rigid face seal design was not possible for drill bits that use a separate floating journal bearing. As shown for instance in U.S. Pat. No. 4,565,800, the effective diameter of the bearing journal is indeterminate. The effective diameter could be either the inside or outside diameter of the bearing, depending on whether it is rotating with the cutter or stationary on the journal. To compensate for this uncertainty, the axial play of the cutter upon the bearing journal is carefully limited, thus limiting the volume change.

Single energizer mechanical face seals are old in the drill bit industry. In addition to the single energizer mechanical face seals cited thus far in this specification, other single energizer mechanical face seals for rolling cutter drill bits are shown in U.S. Pat. Nos. 4,838,365; 4,824,123; 47,847,604; and 4,172,502. These patents utilizing rigid and/or compliant seal faces represent different types of single energizer mechanical face seals for rolling cutter drill bits. Many of these designs have had success in rolling cutter drill bits. However, none have enjoyed widespread commercial success in drill bits with floating journal bearings.

BRIEF SUMMARY OF THE INVENTION

The present invention is a self adjusting, volume balanced, single energizer rigid face seal for rolling cutter drill bits with floating journal bearings. Volume balancing is accomplished by utlizing a floating static seal between the rigid face seal ring and the bearing shaft. This floating static seal ring is moved axially within an annular groove by the volume pulses caused by the axial play of the cutter when in operation. At one end of the annular groove the geometry of the rigid seal ring and bearing shaft are set such that the seal assembly achieves volume balance when the bearing is running on its OD. If the bearing is running on its OD, the floating static seal will move from where ever it is in the annular groove by the volume pulses until it reaches the balance volume position.

At the opposite axial position in the seal groove, there is a different geometrical relationship between the rigid seal ring and bearing shaft. This geometry is such that the seal assembly achieves volume balance when the bearing is running on its ID. Once again, if the bearing is running on its ID the floating static seal will move from where ever it is in the annular groove by the volume pulses until the volume is balanced. This self adjusting movement allows the rigid face seal to be volume balanced even though the journal bearing slides on indeterminate diameters.

Another aspect of the present invention is a non-elastomeric energization system which also transmits the torque from the rigid face seal ring to the bearing shaft. The energizer may be in the form of a metallic Belleville spring with a number of tabs. One set of the tabs engages the seal ring, and the other set of tabs engages the leg or bearing shaft of the drill bit. Because it is a metallic spring, it is not subject to compression set, as are elastomers. Many different configurations of non-elastomeric energizers are possible.

It is also contemplated in the present invention that the center portion of the annular groove be provided with a slightly smaller inside diameter than either end portion. This provides a mechanical means to center the floating static seal.

Disclosed is a rolling cutter drill bit comprising a bit body and a plurality of depending legs. A bearing shaft is formed on one of the legs, and a rolling cutter is rotatably mounted upon the bearing shaft. A floating journal bearing is disposed between the rolling cutter and the bearing shaft. A lubricant is provided between the rolling cutter and the bearing shaft, and a single energizer rigid face seal is mounted upon the bearing shaft to rotatably seal the lubricant within the cutter. The single energizer rigid face seal comprises a rigid seal ring, a floating static seal, and a non-sealing resilient energizer. An annular groove is formed between the rigid seal ring and the bearing shaft to contain the floating static seal. The floating static seal moves axially within the annular groove to a first operating condition where the seal assembly is volume balanced for the outside diameter of the floating bearing. The floating static seal moves to a second operating condition within the annular groove where the seal assembly is volume balanced for the inside diameter of the floating bearing. The floating static seal is axially displaced between the operating conditions during operation of the drill bit to provide a balanced volume.

DETAILED DESCRIPTION OF THE INVENTION AND THE PREFERRED EMBODIMENT

Figure 1:
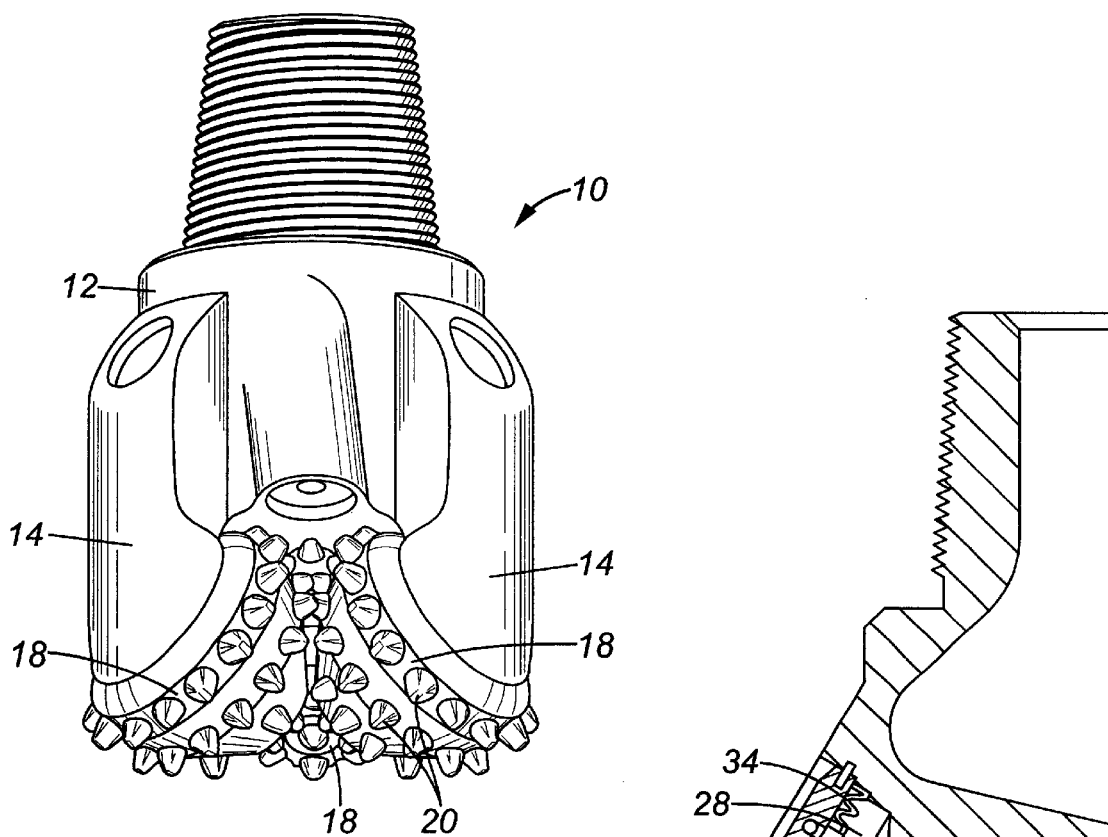
FIG. 1 is a perspective view of a typical rolling cutter drill bit.
Figure 2:
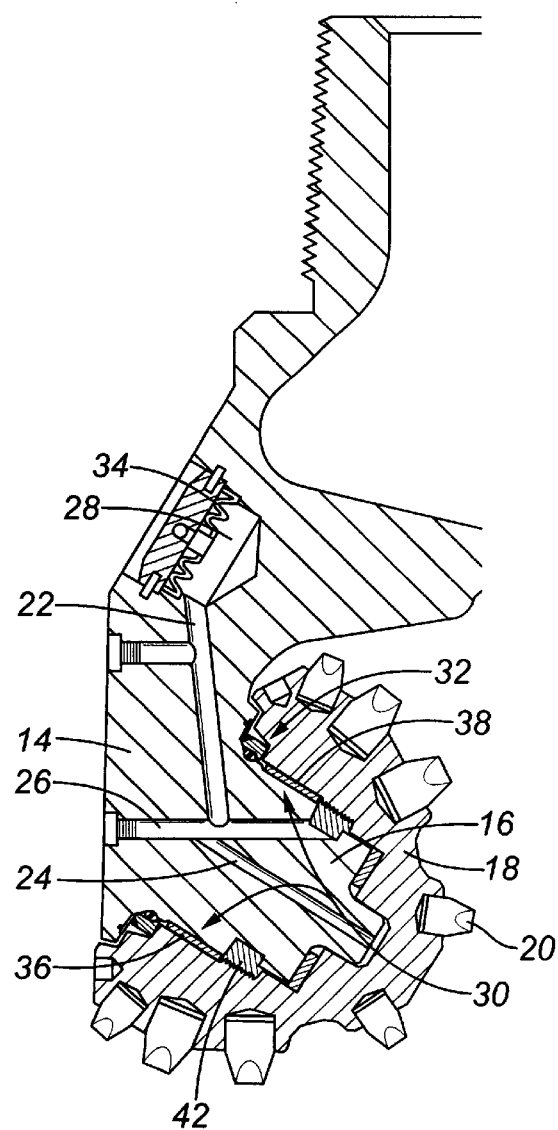
FIG. 2 is a cross section view through one of a rolling cutter drill bit with a rigid face seal assembly of the preferred embodiment of the present invention.

Referring now to the drawings in more detail, and particularly to FIGS. 1 and 2. A rolling cutter rock drilling bit 10 includes a body 12 with a plurality of leg portions 14. A rolling cutter rock drilling bit 10 is also commonly called a rock bit, a rolling cutter drill bit or an oilfield drill bit. A cantilevered bearing shaft 16 formed on each leg 14 extends inwardly and downwardly. A rolling cutter 18 is rotatably mounted upon the shaft 16. Attached to the rolling cutter 18 are hard, wear resistant cutting inserts 20 which engage the earth to effect a drilling action and cause rotation of the rolling cutter 18. A floating friction bearing member 36 is mounted between the bearing shaft 16 and a mating bearing cavity 38 formed in the cutter 18. This floating bearing 36 is designed to carry the radial loads imposed upon the cutter 18 during drilling. A retention bearing member 42 is mounted in the cutter 18 to retain the cutter 18 upon the bearing shaft 16 during drilling.

Internal passageways 22, 24, & 26, as well as a reservoir 28 and bearing area 30 of the leg 14, are filled with lubricant (not shown) during bit assembly. The lubricant helps reduce bearing friction and wear during bit operation and is dynamically sealed within the cutter 18 by a rigid face seal assembly 32.

A pressure balancing diaphragm 34 equalizes the pressure between the drilling fluid outside the bit and the lubricant inside the bit and typically has a built in pressure relief means which releases lubricant into the drilling fluid when a predetermined pressure differential is reached. The lubricant release is intended to protect the rigid face seal 32 and pressure balancing diaphragm 34 against unintended rupture or damage.

Figure 3:
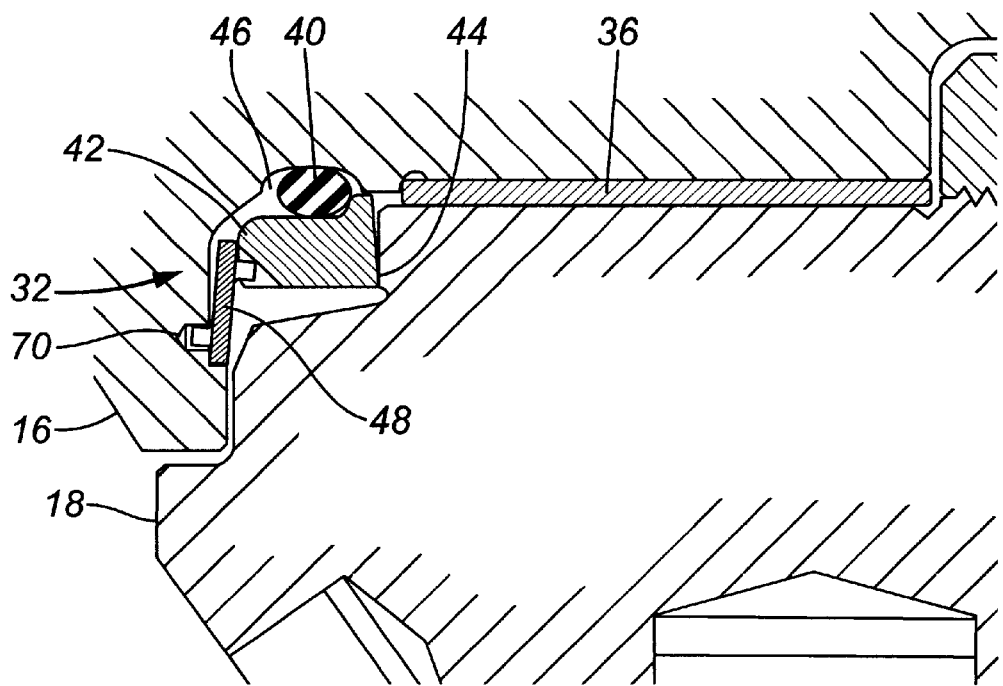
FIG. 3 is an enlarged cross section view of the preferred embodiment seal assembly shown in FIG. 2.

Referring now to FIG. 3, the rigid face seal assembly 32 is comprised of a seal ring 42 which is preferably formed of AISI 440C (UNS S44004) stainless steel, although many other materials are also suitable. Seal ring 42 is sealed with the bearing shaft 16 by a floating static seal 40 and also energized against its mating sealing face 44. They are sealingly erased in the rolling cutter 18 by an elastic energizer ring 48. Since the seal ring 42 does not rotate with respect to the bearing shaft 16 under normal operating conditions it is considered a stationary seal ring.

Figure 4:
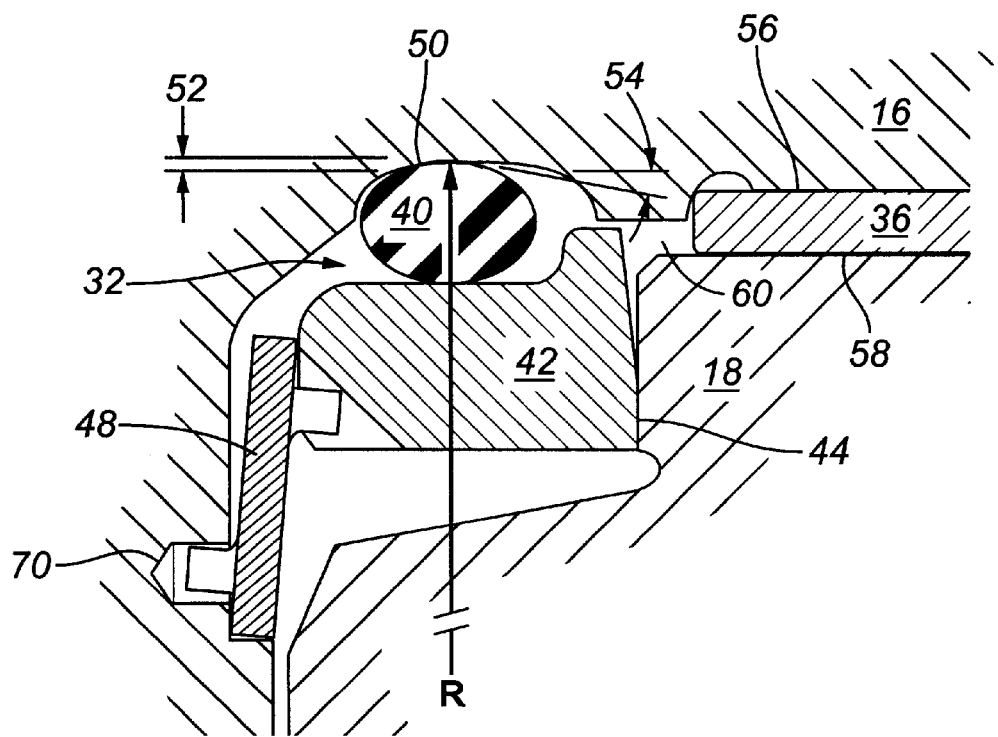
FIG. 4 is an enlarged cross section view of the preferred embodiment seal assembly showing the floating static seal in its centered position.
Figure 5:
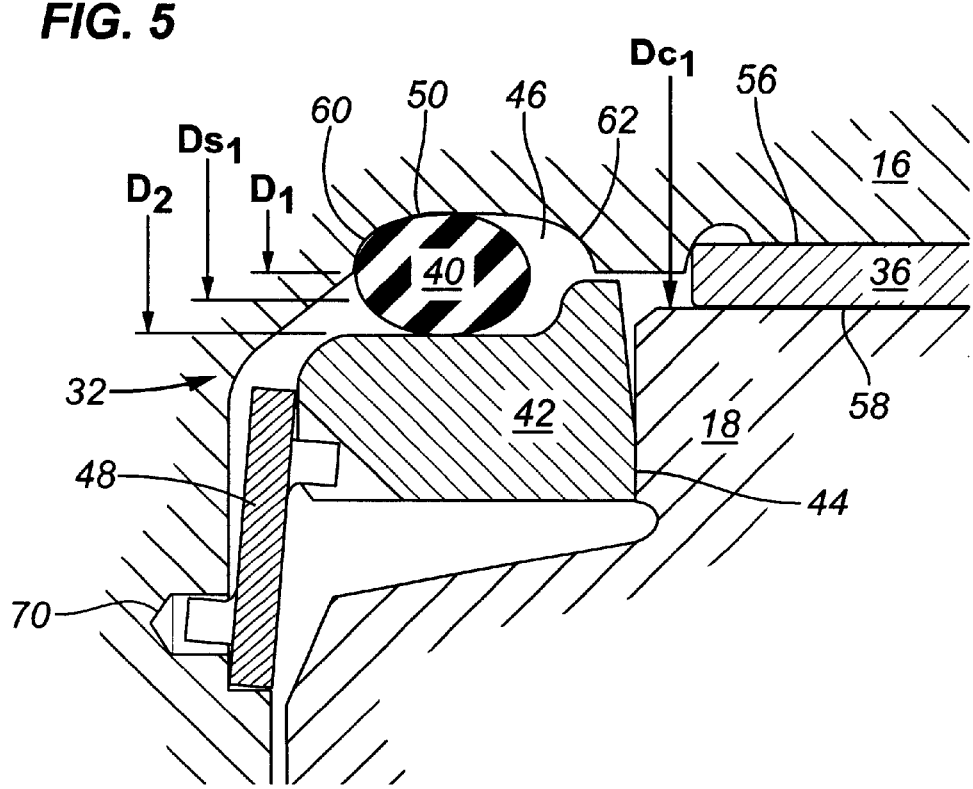
FIG. 5 is an enlarged cross section view of the preferred embodiment seal assembly showing the floating static seal displaced such that the assembly is volume balanced with the outside diameter of the journal bearing.

Referring now to FIGS. 4 and 5, the floating static seal 40 is shown approximately centered in the annular groove 46. The circumferential wall 50 of the annular groove 46 is formed such it has a radius R. The Radius allows the center of the annular groove 46 to be displaced an amount 52 from the ends 60, 62 of the annular groove 46 such that the depth of the annular groove 46 at the center is greater than the depth at one or both of the ends 60, 62. The dimensional relationship between radius R and the annular groove 46 is such that an angle 54 can be defined at the edge of the annular groove 46. Typically angle 54 is between 3 and 10 degrees, although 5 degrees is preferred. Although the floating static seal 40 as allowed to move axially within the annular groove 46 formed in the bearing shaft 16, the radius R in the annular groove 46 tends to center the floating static seal 40. Displacement amounts 52 as small as 0.005 inches are believed to be effective for centering the floating static seal 40.

The floating bearing member 36 is adjacent to the seal assembly 32. As the bit 10 drills into the earth, the floating bearing member 36 will tend to slide either upon its inside diameter (ID) 56 on the bearing shaft 16, or on its outside diameter (OD) 58, in the rolling cutter 18. The floating bearing member 36 may switch between OD and ID sliding many times in one minute as the bit 10 drills. In addition, the rolling cutter 18 moves axially with respect to the bearing shaft 16 as the bit 10 drills due to bearing clearances. This axial displacement can cause volumes changes in the lubricant filling the space 60 between the floating bearing member 36 and the seal assembly 32. The nature and relationships between this volume change and the design geometry of the seal assembly 32 and the floating bearing member 36 is well known in the industry. There tends to be significant vibrations on the drill bit 10 as it drills. Therefore, the rolling cutter 18 may move axially quite rapidly, causing volume pulses in the lubricant in the space 60. To prevent these volume pulses from damaging the seal assembly 32 during operation, it has a self adjusting volume balance design geometry that minimizes the volume change.

As established by the prior art, for effective volume balance, the diameter of the midsection Ds of the floating static seal 40 should be equal to the rotatable journal diameter Dc.

The following dimensions are typical for a 12¼ inch rolling cutter drill bit made in accordance with the present invention. The dimensions are provided for example only and are not intended to limit the invention in any manner. Although these dimensions are provided for a particular 12¼ inch drill bit, they may readily be varied to accommodate different seal and bearing designs, and also other bit sizes.

Referring now to FIG. 5, a volume balanced rigid face seal assembly 32 of the preferred embodiment is shown with the floating bearing member 36 sliding on its OD 58. The floating static seal 40 has been moved to a position at the outside end 60 of the annular groove 46 by the volume pulses in the lubricant due to the differential volume effect of the floating bearing member 36 sliding on its OD. The effective inner sealing diameter D1 of the floating static seal 40 is its greatest diameter of contact with the bearing shaft 16. In the embodiment shown, this diameter D1 is 2.793 inches. The effective outside sealing diameter D2 of the floating static seal 40 is its smallest diameter of contact with the seal ring 42. In the embodiment shown, this diameter D2 is 2.908 inches. The diameter of the midsection Ds1 of the floating static seal 40 is the average of D1 and D2 or (D1+D2)/2. In the embodiment shown, the diameter Ds1= 2.850 inches.

The rotatable journal diameter Dc1 is the outside diameter 58 of the floating bearing member 36, which equals 2.850 inches in the embodiment shown. As can be seen, Ds1=Dc1, thus achieving a volume balanced state.

Figure 6:
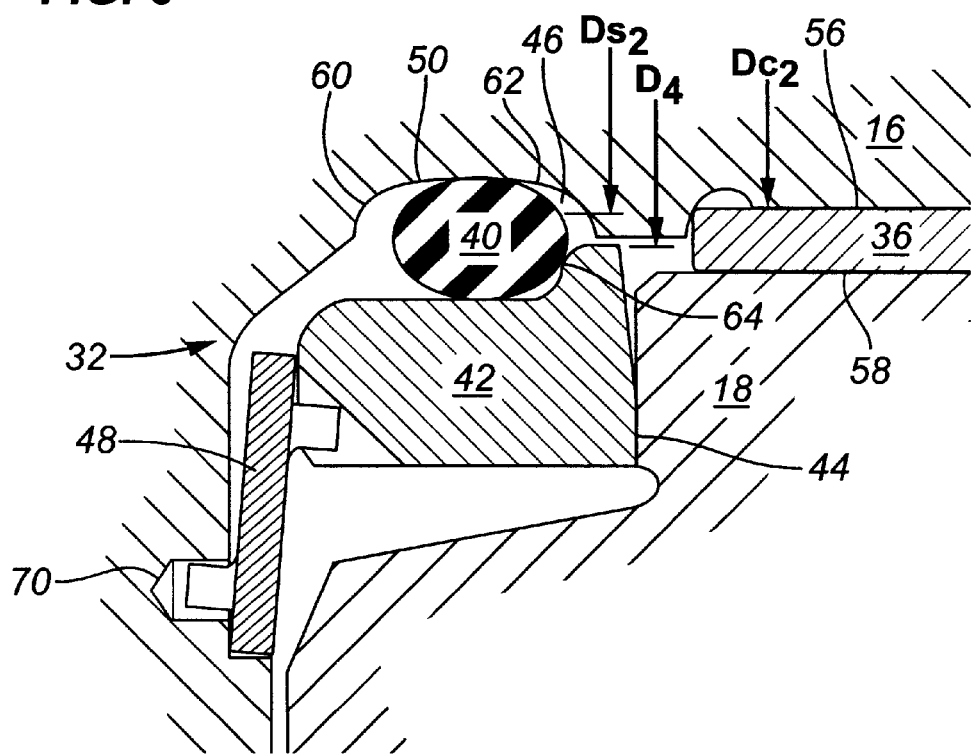
FIG. 6 is an enlarged cross section view of the preferred embodiment seal assembly showing the floating static seal displaced such that the assembly is volume balanced with the inside diameter of the journal bearing.

Referring now to FIG. 6, a volume balanced seal assembly 32 of the preferred embodiment is shown with the floating bearing member 36 sliding on its ID 56. The floating static seal 40 has moved to a position at the inside end 62 of the annular groove 46 such that it contacts the inside ridge 64 of the seal ring. The floating static seal 40 was once again moved by the volume pulses in the lubricant, but this time in the opposite direction due to the differential volume effect of the floating bearing 36 sliding on its ID. In this case, the effective inner sealing diameter D3 of the floating static seal 40 is 2.666 inches, and the effective outside sealing diameter D4 of the floating static seal 40 is 2.782 inches. The diameter of the midsection Ds2 of the floating static seal 40 is the average of D3 and D4 or (D3+D4)/2. In the embodiment shown, the diameter Ds2=2.724 inches.

The rotatable journal diameter Dc2 is the inside diameter 56 of the floating bearing member 36, which equals 2.724 inches in the embodiment shown. As can be seen, Ds2=Dc2, thus achieving a volume balanced state.

As can be seen in FIGS. 5 and 6, the rigid face seal assembly 32 is volume balanced regardless of whether the floating bearing member 36 slides on its OD 58 or its ID 56.

Figure 7:
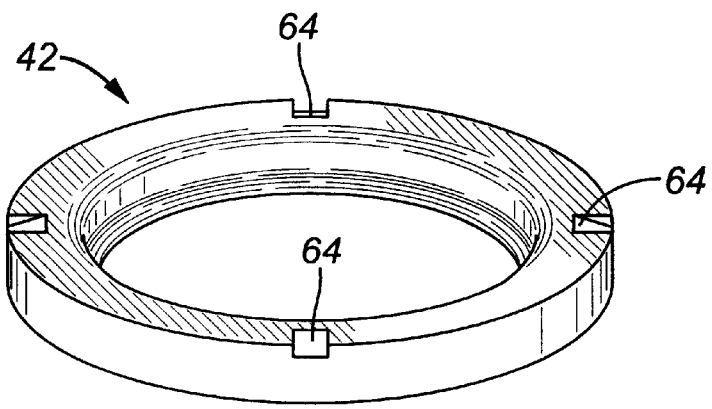
FIG. 7 is a perspective view of the rigid seal ring of the present invention.
Figure 8:
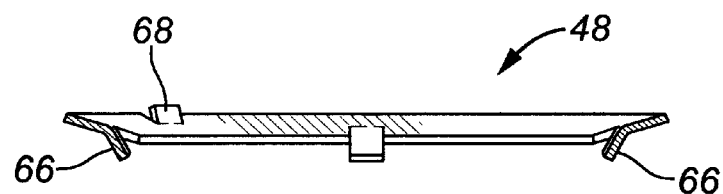
FIG. 8 is a cross-section view of the elastic energizer of the preferred embodiment.
Figure 9:
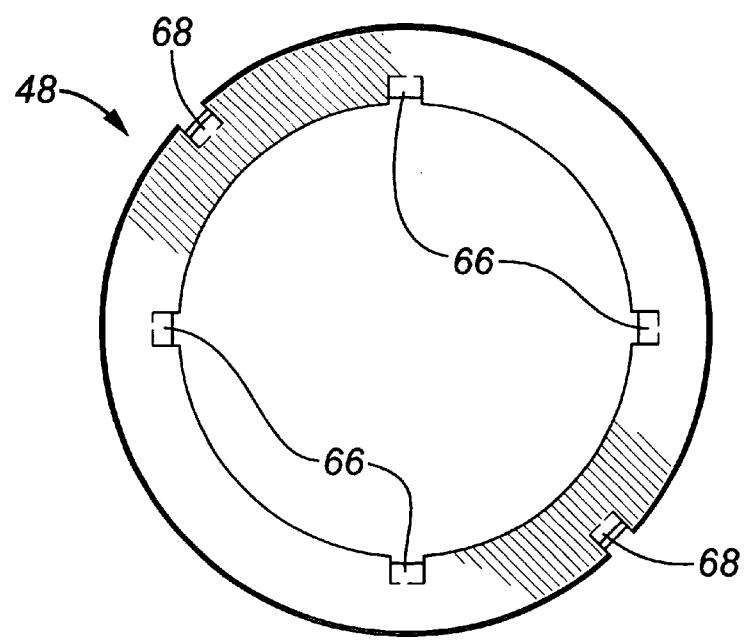
FIG. 9 is a plan view of the elastic energizer of the preferred embodiment.

Referring now to FIG. 7, a perspective view of the seal ring 42 is shown. The seal ring 42 has a plurality of notches 64 about its periphery to engage the inner tabs 66 of the elastic energizer ring 48 shown in FIGS. 8 and 9. These notches 64 and inner tabs 66 are arranged such that they can transmit the torques imposed upon the seal ring 42 to the energizer 48 during operation without interfering with the spring action of the energizer 48. The materials and construction of the rigid seal ring 42 are well known in the rolling cutter drill bit industry.

In the preferred embodiment, the elastic energizer ring 48 is in the form of a Belleville spring with a series of inner tabs 66 for engaging the notches 64 in the rigid seal ring 42. There are also a plurality of outer tabs 68 on the energizer to engage cavities 70 in the base of the bearing shaft 16. This arrangement serves to transmit the torques from the energizer ring 48 to the bearing shaft 16.

The elastic energizer 48 may be formed from any suitable material with good elasticity, chemical resistance and adequate strength for torque transmittal. Materials such as carbon fiber composites, plastics, engineering ceramics and metallic alloys are considered to have the required properties. However, heat treated stainless steel has been found to be well suited to the application.

Although a Belleville spring has been shown as the elastic energizer 48, many forms of elastic energizers may be used. There are an innumerable variety of spring designs which may be suitable for the application.

Whereas the present invention has been described in particular relation to the drawings attached hereto, it should be understood that other and further modifications apart from those shown or suggested herein, may be made within the scope and spirit of the present invention.

What is claimed is:

1. A rolling cutter drill bit comprising a bit body with a plurality of depending legs, a bearing shaft formed on one of the legs, and a rolling cutter rotatably mounted upon the bearing shaft, a bearing cavity formed in the rolling cutter, a floating journal bearing having an outside diameter and an inside diameter, the floating journal bearing mounted between the bearing shaft and the bearing cavity, a lubricant within the bearing cavity, an annular groove formed on the bearing shaft, and a single energizer rigid face seal mounted upon the bearing shaft to rotatably seal the lubricant within the rolling cutter, the single energizer rigid face seal sealingly engaging a sealing face in the rolling cutter, the single energizer rigid face seal comprising a rigid seal ring, a floating static seal, and a non-sealing elastic energizer, the floating static seal is mounted in the annular groove between the rigid seal ring and the bearing shaft, the floating static seal axially movable within the annular groove to a first operating position wherein the seal assembly is volume balanced for the outside diameter of the floating bearing, the floating static seal axially movable to a second operating position within the annular groove wherein the seal assembly is volume balanced for the inside diameter of the floating journal bearing, wherein the floating static seal is axially displaced during operation between the first and the second operating positions.

2. The rolling cutter drill bit of claim 1 wherein the seal ring has a periphery with a plurality of notches.

3. The rolling cutter drill bit of claim 2 wherein the non-sealing elastic energizer comprises a ring with a first plurality of tabs to engage the notches in the seal ring and a second plurality of tabs to engage the bearing shaft.

4. The rolling cutter drill bit of claim 3 wherein the non-sealing elastic energizer is a Belleville spring.

5. The rolling cutter drill bit of claim 4 wherein the non-sealing elastic energizer is formed of a material selected from the group consisting of carbon fiber composites, plastics, engineering ceramics, and metallic alloys.

6. The rolling cutter drill bit of claim 5 wherein the non-sealing elastic energizer is formed of heat treated stainless steel.

7. The rolling cutter drill bit of claim 1 wherein the non-sealing elastic energizer is formed of a material selected from the group consisting of carbon fiber composites, plastics, engineering ceramics, and metallic alloys.

8. The rolling cutter drill bit of claim 7 wherein the non-sealing elastic energizer is formed of heat treated stainless steel.

9. A rolling cutter drill bit comprising a bit body and a plurality of depending legs, a bearing shaft formed on one of the legs, and a rolling cutter rotatably mounted upon the bearing shaft, a bearing cavity formed in the rolling cutter, a floating journal bearing having an outside diameter and an inside diameter, the floating journal bearing mounted between the bearing shaft and the bearing cavity, a lubricant within the bearing cavity, an annular groove formed on the bearing shaft, the annular groove having a center portion, two ends and a circumferential wall, a single energizer rigid face seal mounted upon the bearing shaft to rotatably seal the lubricant within the rolling cutter, the single energizer rigid face seal sealingly engaging a sealing face in the rolling cutter, the single energizer rigid face seal comprising a rigid seal ring, a floating static seal, and a non-sealing resilient energizer, the floating static seal mounted in the annular groove between the rigid seal ring and the bearing shaft, the floating static seal axially movable within the annular groove to a first operating position wherein the seal assembly is volume balanced for the outside diameter of the floating journal bearing, the floating static seal axially movable to a second operating position within the annular groove wherein the seal assembly is volume balanced for the inside diameter of the floating bearing, wherein the annular groove has a first depth at its center portion, and a second depth at one of its ends, wherein the first depth is greater than the second depth.

10. The rolling cutter drill bit of claim 9 wherein the seal ring has a periphery with a plurality of notches.

11. The rolling cutter drill bit of claim 10 wherein the non-sealing elastic energizer comprises a ring with a first plurality of tabs to engage the notches in the seal ring and a second plurality of tabs to engage the bearing shaft.

12. The rolling cutter drill bit of claim 11 wherein the non-sealing elastic energizer is a Belleville spring.

13. The rolling cutter drill bit of claim 12 wherein the non-sealing elastic energizer is formed of a material selected from the group consisting of carbon fiber composites, plastics, engineering ceramics, and metallic alloys.

14. The rolling cutter drill bit of claim 13 wherein the non-sealing elastic energizer is formed of heat treated stainless steel.

15. The rolling cutter drill bit of claim 9 wherein the non-sealing elastic energizer is formed of a material from a group consisting of carbon fiber composites, plastics, engineering ceramics, and metallic alloys.

16. The rolling cutter drill bit of claim 15 wherein the non-sealing elastic energizer is formed of heat treated stainless steel.

17. The rolling cutter drill bit of claim 9, wherein the first depth is 0.005 inches or greater than the second depth.

* * * * *